US010359008B2

(12) United States Patent
Jackson et al.

(10) Patent No.: US 10,359,008 B2
(45) Date of Patent: *Jul. 23, 2019

(54) DIFFERENTIAL FUELING BETWEEN DONOR AND NON-DONOR CYLINDERS IN ENGINES

(71) Applicant: GENERAL ELECTRIC COMPANY, Schenectady, NY (US)

(72) Inventors: Jennifer Lynn Jackson, Troy, NY (US); Adam Edgar Klingbeil, Ballston Lake, NY (US); Thomas Michael Lavertu, Clifton Park, NY (US)

(73) Assignee: GE Global Sourcing LLC, Norwalk, CT (US)

( * ) Notice: Subject to any disclaimer, the term of this patent is extended or adjusted under 35 U.S.C. 154(b) by 348 days.

This patent is subject to a terminal disclaimer.

(21) Appl. No.: 15/150,457

(22) Filed: May 10, 2016

(65) Prior Publication Data
US 2016/0252027 A1 Sep. 1, 2016

Related U.S. Application Data

(63) Continuation-in-part of application No. 14/515,992, filed on Oct. 16, 2014, now Pat. No. 9,334,841.

(51) Int. Cl.
F02M 69/04 (2006.01)
F02M 26/04 (2016.01)
F02D 41/00 (2006.01)
F02M 26/01 (2016.01)
F02M 43/00 (2006.01)
(Continued)

(52) U.S. Cl.
CPC ......... F02M 26/04 (2016.02); F02D 19/0647 (2013.01); F02D 19/0694 (2013.01); F02D 19/081 (2013.01); F02D 41/0025 (2013.01); F02D 41/0027 (2013.01); F02D 41/0065 (2013.01); F02D 41/0082 (2013.01); F02M 26/01 (2016.02); F02M 43/00 (2013.01); F02B 29/0412 (2013.01); F02B 37/013 (2013.01); F02D 41/0007 (2013.01); F02D 41/34 (2013.01); F02D 41/40 (2013.01); F02M 26/22 (2016.02); F02M 26/43 (2016.02); Y02T 10/36 (2013.01); Y02T 10/47 (2013.01)

(58) Field of Classification Search
CPC ............ F02M 25/0749; F02D 19/0642; F02D 19/081; Y02T 10/36
USPC ............. 123/568.11, 525, 575, 445; 701/104
See application file for complete search history.

(56) References Cited

U.S. PATENT DOCUMENTS 9,334,841 B1 * 5/2016 Jackson ................ F02M 43/00
2013/0030672 A1 * 1/2013 Klingbeil ............ F02D 41/0085
701/109

(Continued)

Primary Examiner — Marguerite J McMahon
Assistant Examiner — James J Kim
(74) Attorney, Agent, or Firm — McCoy Russell LLP

(57) ABSTRACT

A method for use with an internal combustion engine having both donor and non-donor cylinder groups includes: injecting a fuel in one, or both, of the groups; injecting a second fuel in both groups at a first substitution rate; recirculating an exhaust emission from the donor cylinder group to both groups; combusting a mixture of air, the first fuel, the second fuel and the exhaust emission in both cylinder groups; and lowering the substitution rate of the second fuel in one, or both, of the cylinder groups. Other methods of controlling an engine and a system are also disclosed.

26 Claims, 4 Drawing Sheets

(51) Int. Cl.
    *F02D 19/06*      (2006.01)
    *F02D 19/08*      (2006.01)
    *F02D 41/34*      (2006.01)
    *F02D 41/40*      (2006.01)
    *F02B 29/04*      (2006.01)
    *F02M 26/22*      (2016.01)
    *F02M 26/43*      (2016.01)
    *F02B 37/013*     (2006.01)

(56)              References Cited

U.S. PATENT DOCUMENTS

| | | | | |
|---|---|---|---|---|
| 2013/0133616 | A1* | 5/2013 | Klingbeil | F02D 19/081 |
| | | | | 123/304 |
| 2013/0220288 | A1* | 8/2013 | Klingbeil | F02D 41/0065 |
| | | | | 123/568.12 |
| 2013/0283766 | A1* | 10/2013 | Primus | F02D 41/0065 |
| | | | | 60/274 |
| 2013/0311066 | A1* | 11/2013 | Guimaraes | F02D 41/3094 |
| | | | | 701/104 |
| 2014/0033705 | A1* | 2/2014 | Blythe | F02D 41/0065 |
| | | | | 60/605.2 |
| 2014/0278011 | A1* | 9/2014 | Geckler | F02D 41/0052 |
| | | | | 701/108 |
| 2014/0360461 | A1* | 12/2014 | Ulrey | F02M 26/43 |
| | | | | 123/299 |
| 2015/0219027 | A1* | 8/2015 | zur Loye | F02D 41/0027 |
| | | | | 60/603 |

* cited by examiner

DIFFERENTIAL FUELING BETWEEN DONOR AND NON-DONOR CYLINDERS IN ENGINES

CROSS-REFERENCE TO RELATED APPLICATIONS

This Continuation-In-Part (C.I.P.) application claims priority to, commonly assigned, U.S. application Ser. No. 14/515,992, filed 16 Oct. 2014, Entitled: DIFFERENTIAL FUELING BETWEEN DONOR AND NON-DONOR CYLINDERS IN ENGINES. The contents of which are incorporated herein by reference in its entirety.

BACKGROUND

The present technology relates generally to engines and, in particular, to methods and systems for an engine having differential fueling between donor and non-cylinders operating with exhaust gas recirculation (EGR).

A dual-fuel engine is an alternative internal combustion engine designed to run on more than one fuel each stored in separate vessels. Dual fuel engines are known for various applications, such as generator sets, engine-driven compressors, engine driven pumps, machine, off-highway trucks, locomotives, and others. Such engines are capable of burning varying proportions of the resulting blend of fuels in the combustion chamber and the fuel injection or spark timing may be adjusted according to the blend of fuels in the combustion chamber. The operation of such engines by substitution of a certain amount of heavy fuel, such as diesel, with a lighter fuel, such as natural gas, biogas, liquid petroleum gas (LPG) or other types of fuel that may be more readily available and cost effective, makes them more effective to operate.

However, those engines having donor cylinders operate at higher exhaust pressure for the donor cylinders, resulting in increased exhaust gas residuals, potentially causing knock in the donor cylinders. Also, the increased exhaust gas residuals limit the attainable substitution rate in the dual fuel engines since lighter fuels such as natural gas are more susceptible to knock. Further, the exhaust emissions generally include pollutants such as carbon oxides (e.g., carbon monoxide), nitrogen oxides ($NO_x$), sulfur oxides ($SO_x$), and particulate matter (PM). The amount and relative proportion of these pollutants varies according to the fuel-air mixture, compression ratio, injection timing, environmental conditions (e.g., atmospheric pressure, temperature, etc.), and the like.

There is therefore a desire for an improved system and method for operating engines.

BRIEF DESCRIPTION

In accordance with an example of the present technology, a method of controlling an engine, comprises: injecting a first fuel and a second fuel to each of a donor cylinder group and a non-donor cylinder group of the engine; injecting a lower fraction of the second fuel into the donor cylinder group in comparison to the second fuel being injected into the non-donor cylinder group; recirculating an exhaust emission from the donor cylinder group to the non-donor cylinder group and the donor cylinder group; and combusting a mixture of air, the first fuel, the second fuel and the exhaust emission from the donor cylinder group in both the donor cylinder group and the non-donor cylinder group.

In accordance with another example of the present technology, a system comprises: an engine comprising: a donor cylinder group coupled to an intake manifold, wherein the intake manifold is configured to feed a flow of air to the donor cylinder group; a non-donor cylinder group coupled to the intake manifold and an exhaust manifold, wherein the intake manifold is further configured to feed air to the non-donor cylinder group; a first direct injector disposed in each cylinder of the donor cylinder group configured to inject a first fuel from a first fuel source and a second injector disposed in either each of a plurality of first intake passages or each cylinder of the donor cylinder group configured to inject a second fuel from a second fuel source; a third direct injector disposed in each cylinder of the non-donor cylinder group configured to inject the first fuel from the first fuel source and a fourth injector disposed in either each of a plurality of second intake passages or each cylinder of the non-donor cylinder group for injecting the second fuel from the second fuel source; and an exhaust channel extending from the donor cylinder group to the intake manifold for recirculating an exhaust emission from the at least one donor cylinder to the at least one donor, and non-donor cylinders via the intake manifold; and a controller configured to, during a single engine cycle, operate the first direct injector, the second injector, the third injector, and the fourth injector such that there is a higher fraction of injection of the first fuel into the donor cylinder group in comparison to the first fuel being injected into the non-donor cylinder group and a lower fraction of injection of the second fuel into the donor cylinder group in comparison to the second fuel being injected into the non-donor cylinder group.

In accordance with another example of the present technology, a method of controlling an engine, comprises: injecting a first fuel and a second fuel to each of a donor cylinder group and a non-donor cylinder group of the engine; injecting a lower fraction of the first fuel into the donor cylinder group in comparison to the first fuel being injected into the non-donor cylinder group; injecting a higher fraction of the second fuel into the donor cylinder group in comparison to the second fuel being injected into the non-donor cylinder group; combusting a mixture of air, the first fuel, the second fuel in the donor cylinder group and the non-donor cylinder group and an exhaust emission from the donor cylinder group; operating the donor cylinder group, during low power or low temperature conditions, at a first fuel injection timing so as to obtain higher substitution rate of the first fuel as compared to a substitution rate of the first fuel in the non-donor cylinder group causing generation of emissions from the donor cylinder group having increased amounts of one of carbon monoxide and unburned hydrocarbons; and recirculating the exhaust emission from the donor cylinder group to the non-donor cylinder group and the donor cylinder group for oxidizing the increased amounts of at least one of carbon monoxide and unburned hydrocarbons.

In accordance with another example of the present technology, a method for use with an internal combustion engine having a donor cylinder group and a non-donor cylinder group, the method comprising: injecting a first fuel in one of the donor cylinder group and the non-donor cylinder group; injecting a second fuel in the donor cylinder group and the non-donor cylinder group at a first substitution rate; recirculating an exhaust emission from the donor cylinder group to the non-donor cylinder group and the donor cylinder group; combusting a mixture of air, the first fuel, the second fuel and the exhaust emission in the non-donor cylinder group and the donor cylinder group; and changing the substitution rate of the second fuel to a second substitution rate lower than the first substitution rate in one of the donor cylinder group and the non-donor cylinder group.

DRAWINGS

These and other features, aspects, and advantages of the present technology will become better understood when the following detailed description is read with reference to the accompanying drawings in which like characters represent like parts throughout the drawings, wherein:

FIG. 1 schematically shows a system for controlling an engine in accordance with an example of the present technology;

DETAILED DESCRIPTION

When introducing elements of various embodiments of the present technology, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed examples.

Figure 1:
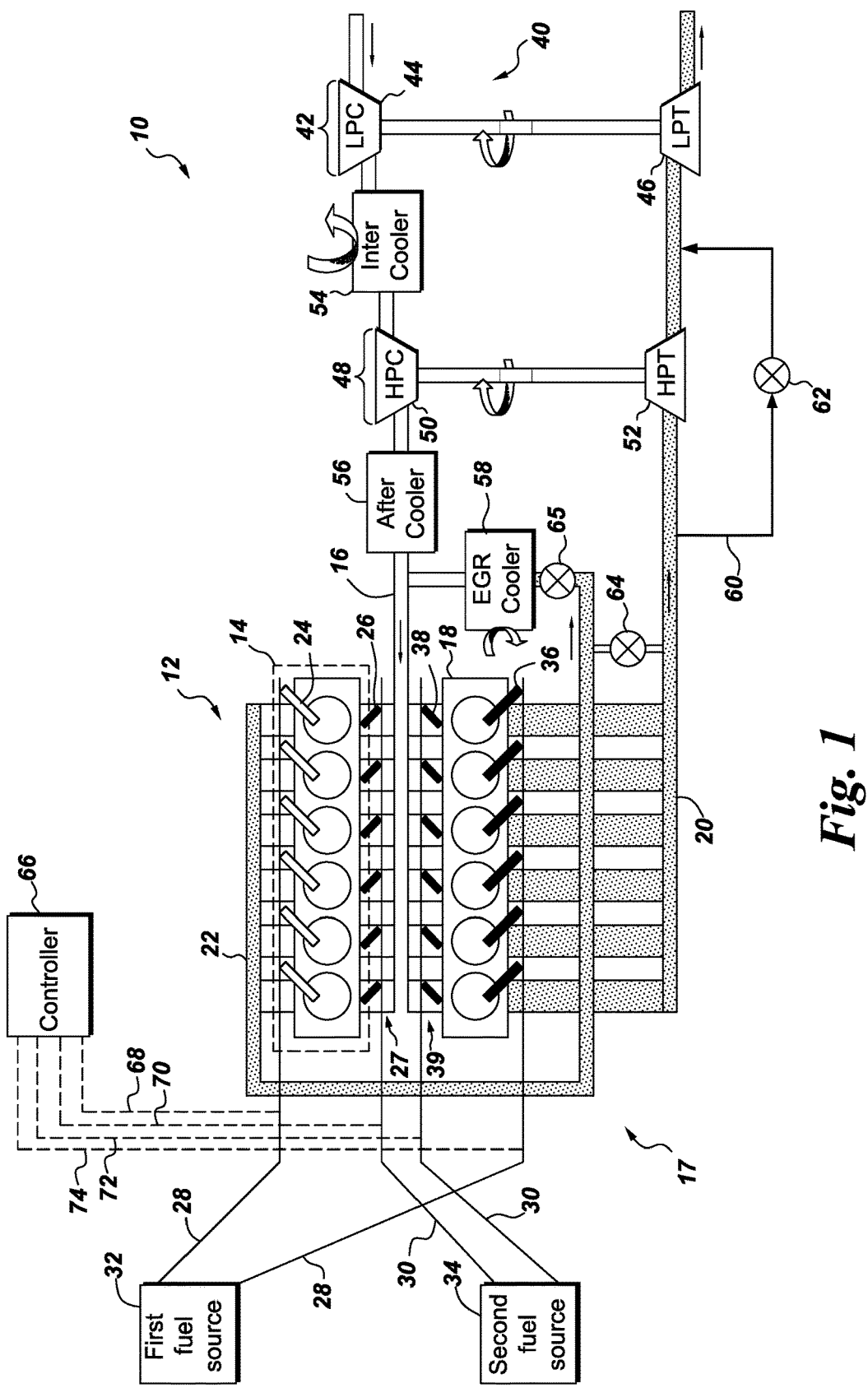

FIG. 1 schematically shows a system 10 for controlling a dual-fuel engine 12 in accordance with an example of the present technology. The dual-fuel engine 12 includes a donor cylinder group 14 having multiple donor cylinders coupled to an intake manifold 16 that is configured to feed a flow of air to the donor cylinder group. The dual-fuel engine 12 also includes a non-donor cylinder group 18 coupled to the intake manifold 16 and an exhaust manifold 20. The intake manifold 16 is further configured to feed air to the non-donor cylinder group 18. The dual fuel engine 12 also includes an exhaust channel 22 extending from the donor cylinder group 14 to the intake manifold 16 for recirculating an exhaust emission in an exhaust gas recirculation (EGR) loop 17 from the donor cylinders to both donor cylinders 14, and non-donor cylinders 18 via the intake manifold 16.

Although the embodiment depicted in FIG. 1 shows a specific quantity of cylinders in the donor cylinder group 14 and the non-donor cylinder group 18 (i.e., 6 each), other quantities are possible. For example, the quantity of cylinders in the donor cylinder group 14 may be the same, or different, than the quantity of cylinders in the non-donor cylinder group 18. Similarly, the quantity of cylinders in the donor cylinder group 14 and non-donor cylinder group 18 may more, or less, than six cylinders in each group 14, 18.

Further each cylinder of the donor cylinder group 14 includes a first direct injector 24 that injects a first fuel 28 from a first fuel source 32. The system 10 also includes a second injector 26, for example a port injector disposed in each of a plurality of first intake passages 27, configured to inject a second fuel 30 from a second fuel source 34. Similarly, each cylinder of the non-donor cylinder group 18 includes a third direct injector 36 and a fourth injector 38. The third direct injector 36 injects the first fuel 28 from the first fuel source 32, while the fourth injector 38, for example disposed in each of a plurality of second intake passages 39, injects the second fuel 30 from the second fuel source 34. In one embodiment, the first fuel 28 includes a diesel fuel. The second fuel 30 may include at least one of natural gas, nitrogen, hydrogen, syngas, gasoline, ethanol, carbon monoxide, propane, biogas, liquid petroleum gas (LPG).

Note that while FIG. 1 illustrates the third and fourth injectors 26, 38 located as port injectors (e.g., located in intake passages 27, 39) the third and/or fourth injectors 26, 38 may be direct injectors and, as such, be configured to directly inject fuel into the respective cylinder groups.

Furthermore, the system 10 includes a two-staged turbocharger 40 configured to provide compressed air to the dual fuel engine 12 through the intake manifold 16. The two-staged turbocharger 40 includes a first stage turbocharger 42 that includes a low pressure compressor 44 and a low pressure turbine 46. The two-staged turbocharger 40 also includes a second stage turbocharger 48 having a high pressure compressor 50 and a high pressure turbine 52. As shown in FIG. 1, the low pressure compressor 44, the high pressure compressor 50 and the intake manifold 16 are in fluid communication with each other. Ambient air is routed through the low pressure compressor 44 and the high pressure compressor 50 for sufficient compression prior to being directed into the intake manifold 16. The flow of air is cooled in two stages in an intercooler 54 located between the compressors 44, 50 and in an aftercooler 56 located between the high pressure compressor 50 and the intake manifold 16. The exhaust emissions in the exhaust gas recirculation loop 17 are also cooled in an EGR cooler 58 prior to being directed into the intake manifold 16. In one embodiment, each of the intercooler 54, aftercooler 56 and the EGR cooler 58 is a heat exchanger that may utilize a fluid for extracting heat thereby cooling the flow of air and exhaust emissions flowing through each of the cooler. The exhaust emissions flowing out of the non-donor cylinder group 18 through the exhaust manifold 20 are routed through the high pressure turbine 52 and the low pressure turbine 46 prior to being released out of the system 10. As shown in FIG. 1, the high pressure turbine 52 and the low pressure turbine 46 are driven by the force of the exhaust emissions and in turn drive the high pressure compressor 50 and the low pressure compressor 44 respectively. In one embodiment, the system 10 includes a high pressure turbine (HPT) bypass line 60 having a valve 62 that may be operated to route the exhaust emissions directly through the low pressure turbine 46 bypassing the high pressure turbine 52. In another embodiment, the system 10 also includes a valve 64 located in a fluid line connecting the EGR loop 17 and the exhaust manifold 20 for controlling flow of exhaust emissions in the EGR loop 17. In a non-limiting example, the system 10 may include a single staged turbocharger (not shown) configured to provide compressed air to the dual fuel engine 12 through the intake manifold 16.

The system 10 also includes a controller 66 e.g., an electronic control unit (ECU), coupled to various sensors and components throughout the system 10. As shown, the controller 66 includes electrical connections 68, 70, 72 and 74 that are coupled with fuel lines that supply the first fuel 28 and second fuel 30 to the donor cylinder group 14 and the non-donor cylinder group 18. Thus, the controller 66 is configured to, during a single engine cycle, operate the first direct injector 24 and the second port injector 26, the third injector 36 and the fourth port injector 38 in each of the donor cylinder group 14 and the non-donor cylinder group 18 respectively, such that there is a higher fraction of injection of the first fuel into the donor cylinder group in comparison to the first fuel being injected into the non-donor cylinder group and a lower fraction of injection of the second fuel into the donor cylinder group in comparison to the second fuel being injected into the non-donor cylinder group. This operation of differential fueling reduces the risk of knock in the donor cylinder group 14 while maintaining a required power output. In one non-limiting example, a quantity of the first fuel injected into the donor cylinder group 14 is about 40 percent of a total fuel combusted in the donor cylinder group 14, while a quantity of the first fuel injected into the non-donor cylinder group 18 is about 20 percent of a total fuel combusted in the non-donor cylinder group 18. This allows more consumption of the second fuel 30 and thereby, resulting in economical operation of the dual fuel engine 12. This operation of differential fueling is carried out during high load or high ambient temperature conditions. The dual fuel engine 12 is also configured to operate such that the quantity of the first fuel injected into the donor cylinder group 14 may vary from about one percent to about 100 percent.

Moreover, in one embodiment, during low power load conditions or low ambient temperature conditions (e.g., below a standard operating temperature for the engine. A non-limiting example of a standard operating temperature may be 60° F.), the controller 66 is configured to operate the first direct injector 24 and the second port injector 26 in the donor cylinder group 14 at an optimal first fuel injection timing so as to obtain higher substitution rate of the first fuel 28 as compared to substitution rate of the first fuel 28 in the non-donor cylinder group 18. Further, the terms 'substitution rate' to each cylinder in the donor cylinder group may be defined as a ratio of second fuel 30 supply by injector 26 to a total fuel supply by injectors 24, 26. This causes generation of emissions from the donor cylinder group with increased amounts of carbon monoxide. The recirculation of the emissions having increased amounts of carbon monoxide from the donor cylinder group 14 to the non-donor cylinder group 18 and the donor cylinder group 14 for further oxidizing the carbon monoxide. It is to be noted that operating the injectors 24, 26 at optimal first fuel injection timing so as to obtain high substitution rate of the first fuel 28 per the second fuel 30 in each cylinder of the donor cylinder group 14 is carried out at low power or low ambient temperature conditions. In another embodiment, at low power or low ambient temperature conditions, each non-donor cylinder of the non-donor cylinder group 18 may be operated at lower substitution rate in order to control emissions, while donor cylinder group 14 may be operated at high substitution rate. It is to be understood that the terms 'substitution rate' to each cylinder in the non-donor cylinder group may be defined as a ratio of second fuel 30 supply by injector 38 to a total fuel supply by injectors 36, 38.

Figure 2:
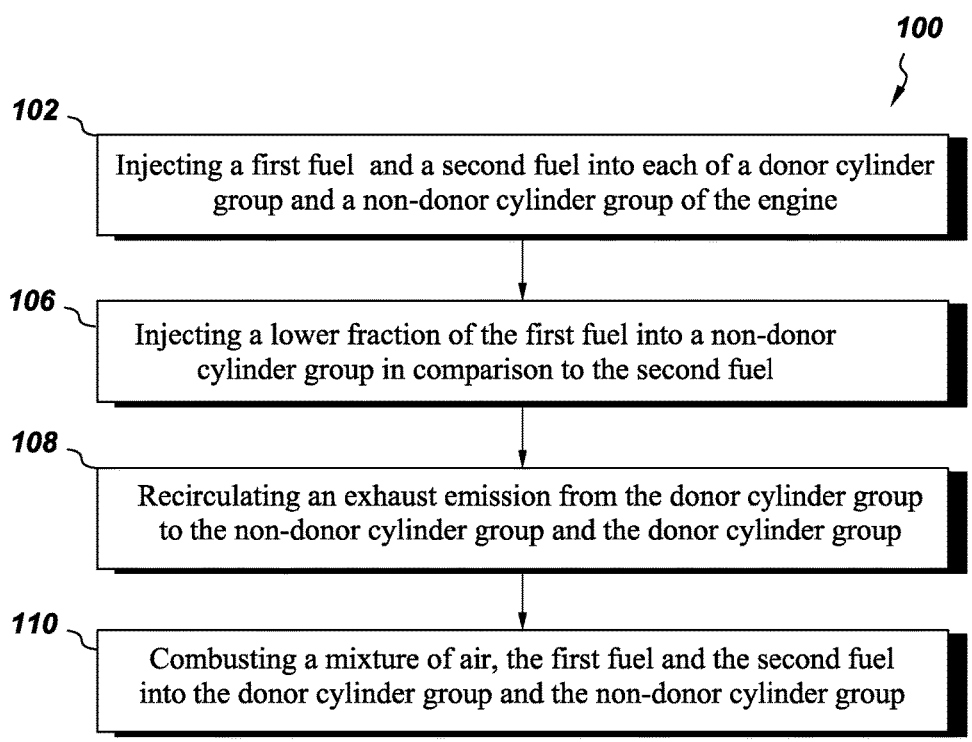
FIG. 2 is a flow chart of a method of controlling an engine in accordance with an embodiment of the present invention.

FIG. 2 is a flow chart 100 of a method of controlling an engine in accordance with embodiment of the present invention. At step 102, the method includes injecting a first fuel and a second fuel to each of a donor cylinder group and a non-donor cylinder group of the engine. In one example, the first fuel includes a diesel fuel. Non-limiting examples of the second fuel includes natural gas, nitrogen, hydrogen, syngas, gasoline, ethanol, carbon monoxide, propane, biogas, liquid petroleum gas (LPG) and mixtures thereof. At step 106, the method includes injecting a lower fraction of the second fuel into the donor cylinder group in comparison to the second fuel being injected into the non-donor cylinder group. In one embodiment, a quantity of the first fuel injected into the non-donor cylinder group is about 20 percent of total fuel combusted in the non-donor cylinder group. Furthermore, at step 108, the method includes recirculating an exhaust emission from the donor cylinder group to the non-donor cylinder group and the donor cylinder group. At step 110, the method includes combusting a mixture of air, the first fuel, the second fuel and the exhaust emission from the donor cylinder group in both the donor cylinder group and the non-donor cylinder group.

In an embodiment, the method 100 may include a step after injecting (i.e., step 102), injecting a higher fraction of the first fuel into the donor cylinder group in comparison to the first fuel being injected into the non-donor cylinder group. A quantity of the first fuel injected into the donor cylinder group can be, for example, about 40 percent of total fuel combusted in the donor cylinder group.

In an embodiment, the step of injecting a lower fraction of the second fuel (i.e., step 106) may comprise lowering the second fuel so as the second fuel is turned off entirely from the donor cylinder group.

Further, the step of injecting a lower fraction of the second fuel (i.e., step 106) may be in response to a change in an ambient condition such as, for example, ambient pressure, ambient temperature, humidity, location, and the like. A non-limiting example may comprise injecting a lower fraction of diesel (i.e., first fuel) into at least the non-donor cylinder group in comparison to the second fuel as the ambient temperature increases. A non-limiting example of when applied could be when the ambient temperature rate of temperature change exceeds a predetermined amount or the ambient temperature goes above a predetermined temperature.

The method may further comprise operating the first direct injector and the second injector in the donor cylinder group at a first fuel injection timing so as to obtain higher substitution rate of the first fuel as compared to a substitution rate of the first fuel in the non-donor cylinder group.

The method may further comprise generating emissions from the donor cylinder group having increase amounts of carbon monoxide and/or hydrocarbon emissions. These generated emissions may be recirculated from the donor cylinder group to the non-cylinder group and donor cylinder group for further oxidizing the increased amounts of carbon monoxide and/or hydrocarbon emissions.

Figure 3:
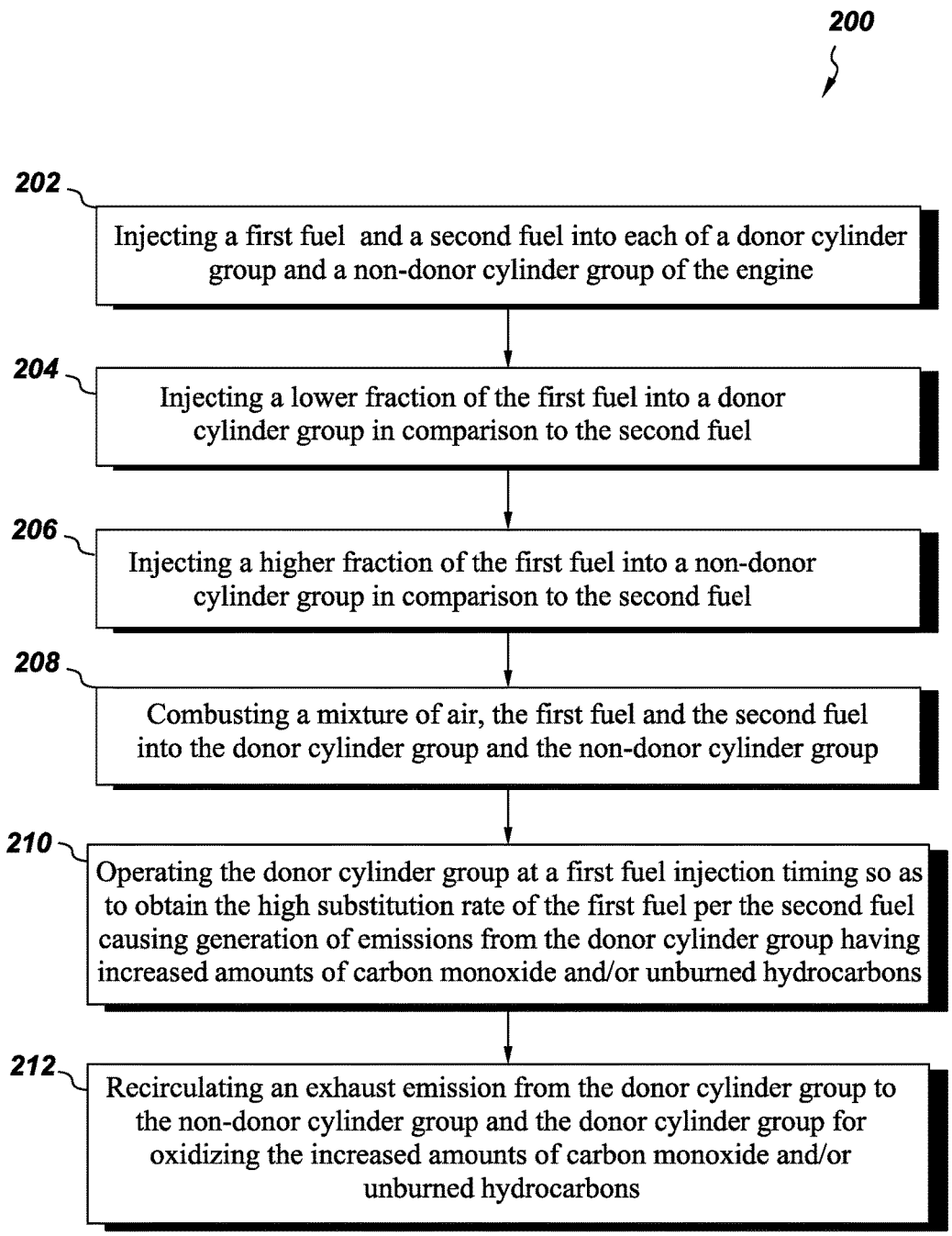
FIG. 3 is a flow chart of a method of controlling an engine in accordance with another embodiment of the present invention.

FIG. 3 is a flow chart 200 of a method of controlling an engine in accordance with embodiment of the present invention. At step 202, the method includes injecting a first fuel and a second fuel to each of a donor cylinder group and a non-donor cylinder group of the engine. In one example, the first fuel includes a diesel fuel. Non-limiting examples of the second fuel includes natural gas, nitrogen, hydrogen, syngas, gasoline, ethanol, carbon monoxide, propane, biogas, liquid petroleum gas (LPG) and mixtures thereof. At step 204, the method includes injecting a lower fraction of the first fuel into the donor cylinder group in comparison to the first fuel being injected into the non-donor cylinder group. In one embodiment, a quantity of the first fuel injected into the donor cylinder group is about 40 percent of total fuel combusted in the donor cylinder group. Further, at step 206, the method includes injecting a higher fraction of the second fuel into the donor cylinder group in comparison to the second fuel being injected into the non-donor cylinder group. In one embodiment, a quantity of the first fuel injected into the non-donor cylinder group is about 20 percent of total fuel combusted in the non-donor cylinder group. Furthermore, at step 208, the method includes combusting a mixture of air, the first fuel, the second fuel in the donor cylinder group and the non-donor cylinder group and an exhaust emission from the donor cylinder group. At step 210, the method includes operating the donor cylinder group, during low power or low temperature conditions (e.g., below a standard operating temperature. A non-limiting example of a standard operating temperature could be 60° F.), at a first fuel injection timing so as to obtain higher substitution rate of the first fuel as compared to a substitution rate of the first fuel in the non-donor cylinder group causing generation of emissions from the donor cylinder group having increased amounts of carbon monoxide and/or unburned hydrocarbons. This operation of the donor cylinder group at the first fuel injection timing is carried out by a controller that controls the first direct injector and the second injector in the donor cylinder group such that there is the first fuel injection timing for obtaining high substitution rate of the first fuel as compared to the substitution rate of the first fuel in the non-donor cylinder group. At step 212, the method includes recirculating an exhaust emission from the donor cylinder group to the non-donor cylinder group and the donor cylinder group for oxidizing the increased amounts of carbon monoxide and/or unburned hydrocarbons.

Figure 4:
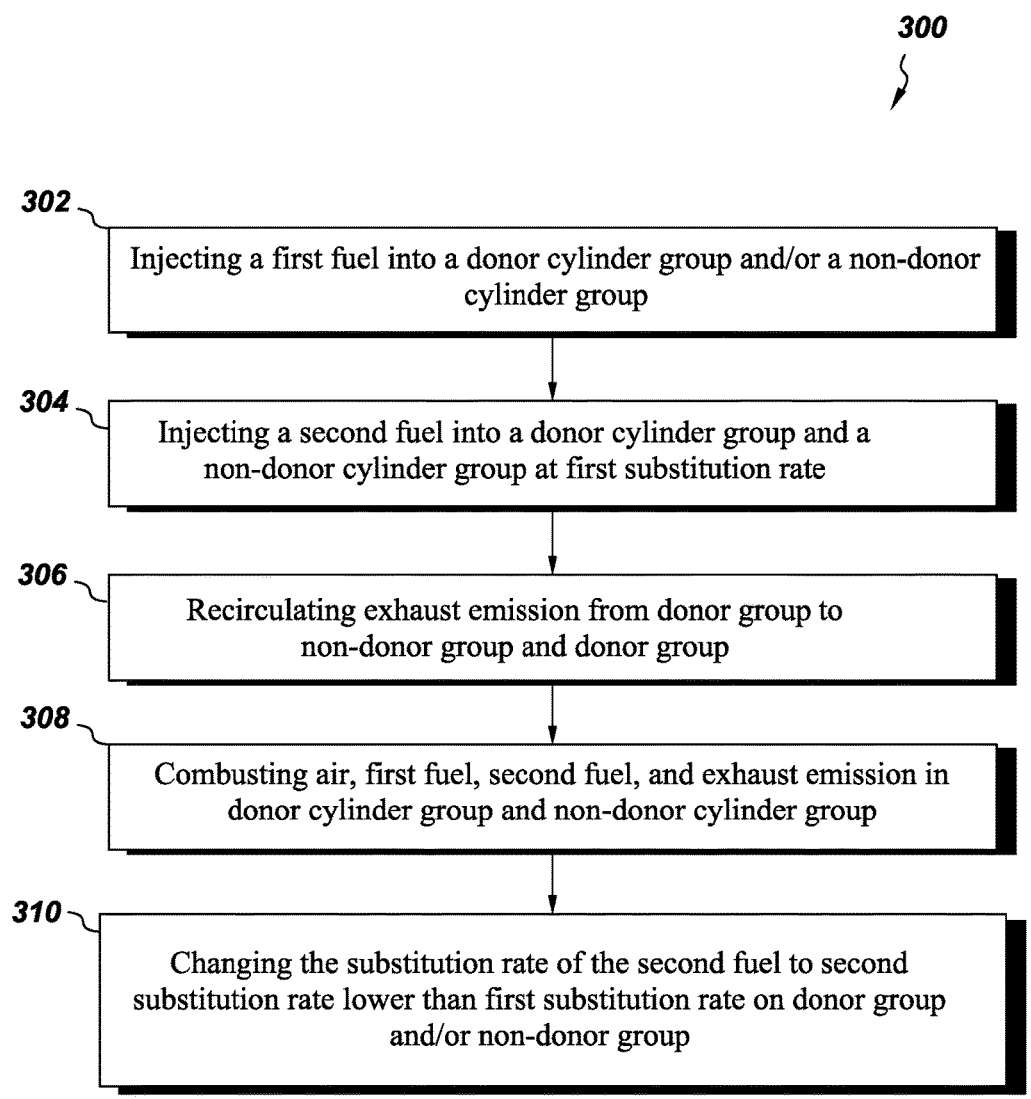
FIG. 4 is a flow chart of a method of controlling an engine in accordance with another embodiment of the present invention.

FIG. 4 is a flow chart 300 of a method for use with an internal combustion engine having a donor cylinder group and a non-donor cylinder group in accordance with embodiment of the present invention. At step 302, the method includes injecting a first fuel into a donor cylinder group and/or a non-donor cylinder group of the engine. At step 304, the method includes injecting a second fuel into the donor cylinder group and the non-donor cylinder group at a first substitution rate. In one example, the first fuel includes a diesel fuel. Non-limiting examples of the second fuel includes natural gas, nitrogen, hydrogen, syngas, gasoline, ethanol, carbon monoxide, propane, biogas, liquid petroleum gas (LPG) and mixtures thereof. Further, at step 306, the method includes recirculating an exhaust emission from the donor cylinder group to both the donor cylinder group and the non-donor cylinder group. Furthermore, at step 308, the method includes combusting a mixture of air, the first fuel, the second fuel, and the exhaust emission from the donor cylinder group in the donor cylinder group and the non-donor cylinder group. At step 310, the method includes changing the substitution rate of the second fuel to a second substitution rate lower than the first substitution rate in at least one of the donor cylinder group and the non-donor cylinder group. In an embodiment, the changing step (i.e., 310) of changing the substitution rate of the second fuel may be in response to a change in an ambient condition such as, for example, ambient pressure, ambient temperature, humidity, location, and the like. A non-limiting example may comprise utilizing geo-fencing so as to reduce the substitution rate when approaching and/or entering a tunnel.

Advantageously, the present invention enables the development of a dual fuel engine operating with the exhaust gas recirculation loop that meets low emissions requirements. The present invention also allows operation with high second fuel substitution, resulting in increased use of second fuel such as natural gas and thereby reducing operational expenses of the dual fuel engines or the reciprocating engines.

Furthermore, the skilled artisan will recognize the interchangeability of various features from different examples. Similarly, the various methods and features described, as well as other known equivalents for each such method and feature, can be mixed and matched by one of ordinary skill in this art to construct additional systems and techniques in accordance with principles of this disclosure. Of course, it is to be understood that not necessarily all such objects or advantages described above may be achieved in accordance with any particular example. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While only certain features of the technology have been illustrated and described herein, many modifications and changes will occur to those skilled in the art. It is, therefore, to be understood that the appended claims are intended to cover all such modifications and changes as fall within the true spirit of the claimed inventions.

The invention claimed is:

1. A method of controlling an engine, comprising:
   injecting a first fuel and a second fuel to each of a donor cylinder group and a non-donor cylinder group of the engine;
   injecting a lower fraction of the second fuel into the donor cylinder group in comparison to the second fuel being injected into the non-donor cylinder group;
   recirculating an exhaust emission from the donor cylinder group to the non-donor cylinder group and the donor cylinder group; and
   combusting a mixture of air, the first fuel, the second fuel, and the exhaust emission from the donor cylinder group in both the donor cylinder group and the non-donor cylinder group.

2. The method of claim 1, further comprising injecting a higher fraction of the first fuel into the donor cylinder group in comparison to the first fuel being injected into the non-donor cylinder group.

3. The method of claim 1, the injecting the lower fraction of the second fuel comprising turning off the second fuel in the donor cylinder group.

4. The method of claim 1, wherein the injecting the lower fraction of the second fuel is in response to a change in an ambient condition.

5. The method of claim 4, wherein the ambient condition comprises one of ambient pressure, ambient temperature, location, and humidity.

6. The method of claim 1, further comprising adjusting injection timing in at least one of the donor cylinder group and the non-donor cylinder group.

7. The method of claim 1, wherein the first fuel comprises a diesel fuel.

8. The method of claim 1, wherein the second fuel comprises at least one of natural gas, nitrogen, hydrogen, syngas, gasoline, ethanol, carbon monoxide, propane, biogas, and liquid petroleum gas (LPG).

9. The method of claim 1, further comprising operating a first direct injector and a second port injector in the donor cylinder group at a first fuel injection timing so as to obtain a higher substitution rate of the first fuel as compared to a substitution rate of the first fuel in the non-donor cylinder group.

10. The method of claim 1, further comprising generating emissions from the donor cylinder group having increased amounts of one of carbon monoxide and hydrocarbon emissions.

11. The method of claim 10, further comprising recirculating the emissions having increased amounts of one of carbon monoxide and hydrocarbon emissions from the donor cylinder group to the non-donor cylinder group and the donor cylinder group for further oxidizing the carbon monoxide.

12. The method of claim 1, further comprising feeding the first fuel directly to the donor cylinder group and the non-donor cylinder group and the second fuel via port injectors disposed in intake passages of the donor cylinder group and the non-donor cylinder group.

13. The method of claim 1, further comprising injecting the first fuel and the second fuel directly to the donor cylinder group and the non-donor cylinder group.

14. A system comprising:
an engine comprising:
a donor cylinder group coupled to an intake manifold, wherein the intake manifold is configured to feed a flow of air to the donor cylinder group;
a non-donor cylinder group coupled to the intake manifold and an exhaust manifold, wherein the intake manifold is further configured to feed air to the non-donor cylinder group;
a first direct injector disposed in each cylinder of the donor cylinder group configured to inject a first fuel from a first fuel source and a second injector disposed in either each of a plurality of first intake passages or each cylinder of the donor cylinder group configured to inject a second fuel from a second fuel source;
a third direct injector disposed in each cylinder of the non-donor cylinder group configured to inject the first fuel from the first fuel source and a fourth injector disposed in either each of a plurality of second intake passages or each cylinder of the non-donor cylinder group for injecting the second fuel from the second fuel source; and
an exhaust channel extending from the donor cylinder group to the intake manifold for recirculating an exhaust emission from at least one donor cylinder to at least one donor, and non-donor cylinders via the intake manifold; and
a controller configured to, during a single engine cycle, operate the first direct injector, the second injector, the third direct injector, and the fourth injector such that there is a higher fraction of injection of the first fuel into the donor cylinder group in comparison to the first fuel being injected into the non-donor cylinder group and a lower fraction of injection of the second fuel into the donor cylinder group in comparison to the second fuel being injected into the non-donor cylinder group.

15. The system of claim 14, wherein the first fuel comprises a diesel fuel.

16. The system of claim 14, wherein the second fuel comprises at least one of natural gas, nitrogen, hydrogen, syngas, gasoline, ethanol, carbon monoxide, propane, biogas, and liquid petroleum gas (LPG).

17. The system of claim 14, wherein the controller operates the first direct injector and the second injector in the donor cylinder group at a first fuel injection timing so as to obtain a higher substitution rate of the first fuel as compared to a substitution rate of the first fuel in the non-donor cylinder group.

18. The system of claim 14, further comprising a two-staged turbocharger having a plurality of compressors and a plurality of turbines.

19. The system of claim 14, wherein a quantity of cylinders in the donor cylinder group is different than a quantity of cylinders in the non-donor cylinder group.

20. The system of claim 14, wherein a quantity of cylinders in the donor cylinder group is the same as a quantity of cylinders in the non-donor cylinder group.

21. A method of controlling an engine, comprising:
injecting a first fuel and a second fuel to each of a donor cylinder group and a non-donor cylinder group of the engine;
injecting a lower fraction of the first fuel into the donor cylinder group in comparison to the first fuel being injected into the non-donor cylinder group;
injecting a higher fraction of the second fuel into the donor cylinder group in comparison to the second fuel being injected into the non-donor cylinder group;
combusting a mixture of air, the first fuel, and the second fuel in the donor cylinder group and the non-donor cylinder group and an exhaust emission from the donor cylinder group;
operating the donor cylinder group, during low power or low temperature conditions, at a first fuel injection timing so as to obtain a higher substitution rate of the first fuel as compared to a substitution rate of the first fuel in the non-donor cylinder group causing generation of emissions from the donor cylinder group having increased amounts of one of carbon monoxide and unburned hydrocarbons; and
recirculating the emission from the donor cylinder group to the non-donor cylinder group and the donor cylinder group for oxidizing the increased amounts of at least one of carbon monoxide and unburned hydrocarbons.

22. The method of claim 21, wherein the first fuel comprises a diesel fuel.

23. The method of claim 21, wherein the second fuel comprises at least one of natural gas, nitrogen, hydrogen, syngas, gasoline, ethanol, carbon monoxide, propane, biogas, and liquid petroleum gas (LPG).

24. A method for use with an internal combustion engine having a donor cylinder group and a non-donor cylinder group, the method comprising:
injecting a first fuel in one of the donor cylinder group and the non-donor cylinder group;
injecting a second fuel in the donor cylinder group and the non-donor cylinder group at a first substitution rate;
recirculating an exhaust emission from the donor cylinder group to the non-donor cylinder group and the donor cylinder group;
combusting a mixture of air, the first fuel, the second fuel and the exhaust emission in the non-donor cylinder group and the donor cylinder group; and
changing the first substitution rate of the second fuel to a second substitution rate lower than the first substitution rate in one of the donor cylinder group and the non-donor cylinder group.

25. The method of claim 24, wherein changing the first substitution rate of the second fuel is in response to a change in an ambient condition.

26. The method of claim 25, wherein the ambient condition comprises one of ambient pressure, ambient temperature, location, and humidity.

* * * * *